United States Patent [19]

Walke

[11] 4,011,800
[45] Mar. 15, 1977

[54] BOTTOM SEAL HORN AND MANDREL
[75] Inventor: Jr. Walke, Wixom, Mich.
[73] Assignee: Ex-Cell-O Corporation, Troy, Mich.
[22] Filed: Mar. 31, 1976
[21] Appl. No.: 672,092
[52] U.S. Cl. .............................. 93/59 MT; 53/375; 156/580; 93/DIG. 1
[51] Int. Cl.[2] ......................................... B32B 31/00
[58] Field of Search .............. 53/375, 379, DIG. 2; 93/59 MT, DIG. 1; 156/73.1, 380, 580, 581

[56] References Cited
UNITED STATES PATENTS 3,912,576   10/1975   Braun ............................ 53/375 X Primary Examiner—Gerald A. Dost
Attorney, Agent, or Firm—Reising, Ethington, Barnard, Perry and Brooks

[57] ABSTRACT

Vibration sealing apparatus including a vibrating horn and a stationary mandrel having rectangular work faces for opposing each other to seal a rectangular end closure of a thermoplastic coated paperboard carton. The work face of the vibrating horn defines an elongated depression extending between a pair of its opposite edges with a predetermined depth and also defines a pair of spaced depressions associated with each of the opposite edges. The spaced depressions have a depth greater than the elongated depression and each pair of the spaced depressions forms a pointed configuration that points toward the other pair of spaced depressions. Preferably, the spaced depressions of each pair have the shape of right triangles with the right angle vertices thereof located adjacent the associated edge of the work face in a spaced relationship thereto and adjacent each other in a spaced relationship. One embodiment of the horn has only one of the triangular depressions of each pair overlapping the elongated depression to provide sealing of a "non-tuck-in" carton end closure. Another embodiment of the work face has both triangular depressions of each pair overlapping the elongated depression to provide sealing of a "tuck-in" carton and closure. In both horn embodiments, an edge depression extends along one of the edges of the work face from one end of the elongated depression outwardly to one side thereof with the same depth as the elongated depression. The mandrel work face includes diagonal depressions defining a central junction at which a pair of opposed triangular projections are located. Preferably, the diagonal depressions of the mandrel work face include offset portions on opposite sides of the junction thereof and have the same depth as the height of the triangular projections and as the depth of the triangular depressions on the horn work face.

17 Claims, 10 Drawing Figures

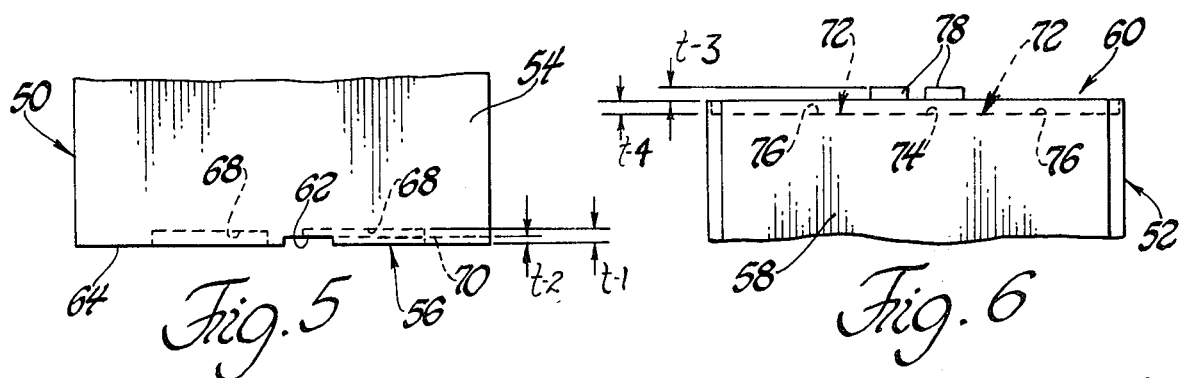
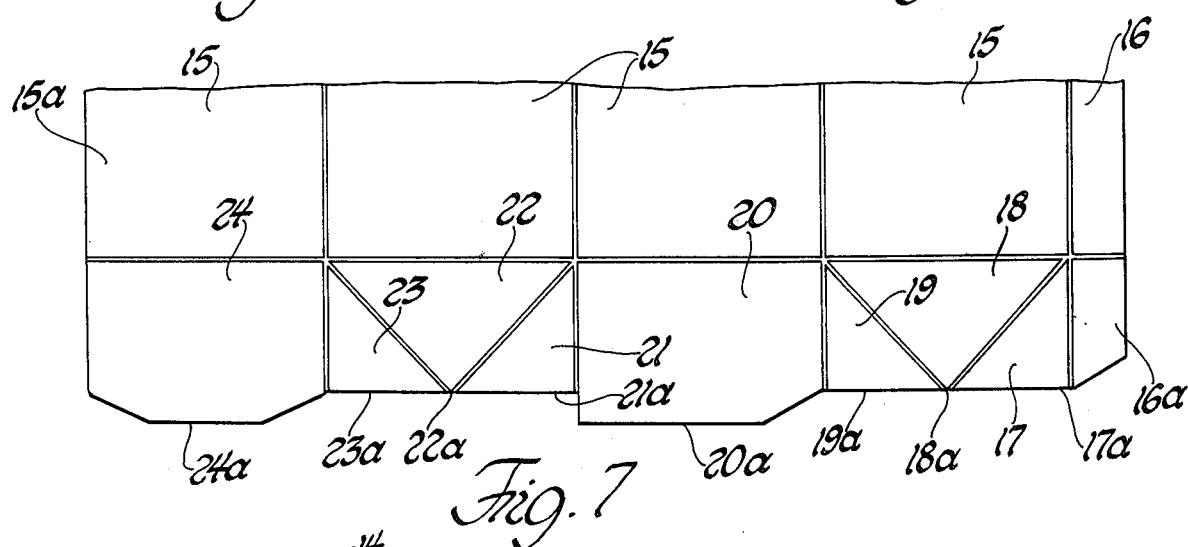
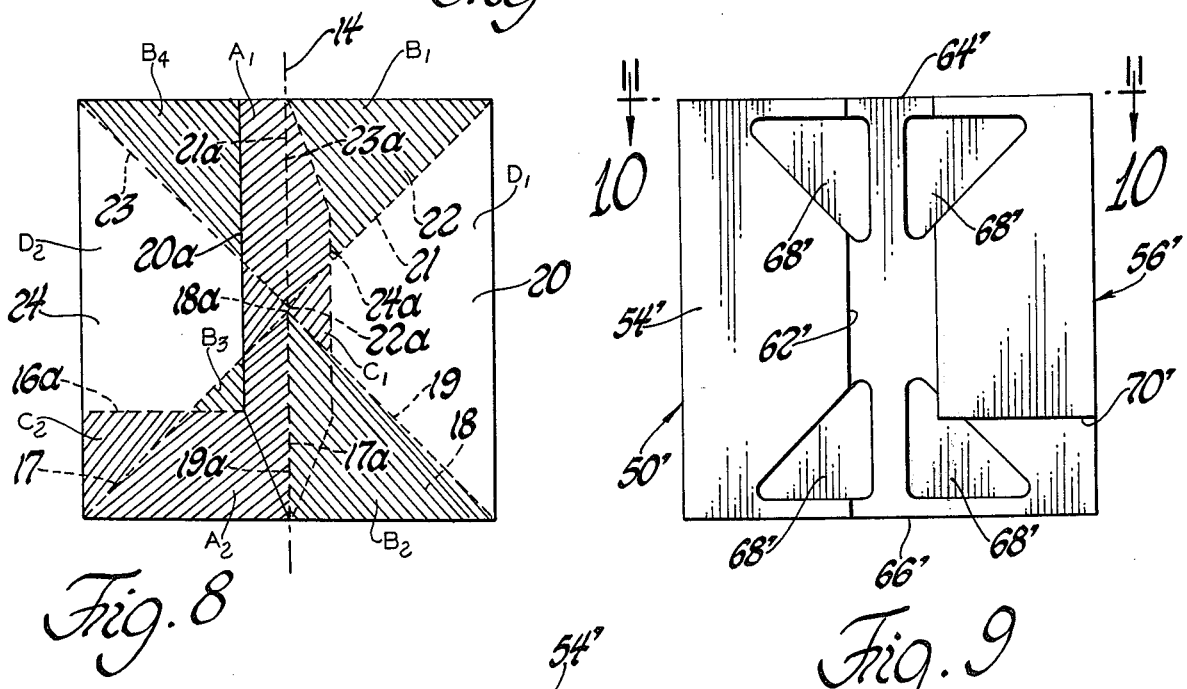

BOTTOM SEAL HORN AND MANDREL

BACKGROUND OF THE INVENTION

1. Field of the Invention

The present invention relates generally to vibration sealing apparatus for sealing a rectangular end closure of a thermoplastic coated paperboard carton.

2. Description of the Prior Art

The prior art includes apparatus for sealing containers of thermoplastic material both by the direct application of heat, and by the generation of heat by vibration. The vibration is usually at a very high frequency, i.e. 20,000 cycles per second, and is frequently referred to as ultrasonic vibration. Examples of prior art apparatus of this type are disclosed in U.S. Pat. Nos. 3,200,557; 3,307,325; 3,309,841; 3,468,731; 3,531,908; 3,562,041; 3,579,958; 3,681,167; 3,717,539; and 3,912,576, as well as German Auslegeschrift 2,165,620.

SUMMARY OF THE INVENTION

The present invention relates to vibration sealing apparatus for sealing a rectangular end closure of a thermoplastic coated paperboard carton and to a vibrating horn and a stationary mandrel of the apparatus that have rectangular work faces for opposing each other with the end closure of the carton between the work faces. One of the work faces defines an elongated depression extending between a pair of opposite edges thereof with a predetermined depth. A pair of spaced depressions are associated with each of the opposite edges of the work face to which the elongated depression extends. The spaced depressions have a greater depth than the elongated depression and each pair of the spaced depressions is spaced from the other pair in an opposed relationship. At least one of the spaced depressions of each pair overlaps with the elongated depression from the same side on the associated work face. The other work face has generally diagonal depressions defining a central junction and at least one triangular projection at the junction of the diagonal depressions.

In the preferred embodiments disclosed, the vibrating horn includes a body defining the work face having the elongated and spaced depressions while the stationary mandrel includes a body defining the work face having the diagonal depressions and the triangular projection. The spaced depressions on the horn work face are in the shape of right triangles whose vertices are located adjacent each other in a spaced relationship from the associated edge of the horn work face so as to provide a pointed configuration that is oriented to point toward the other pair of triangular depressions. An edge depression in the horn work face extends along one of the edges to which the elongated depression extends with the same depth as the elongated depression. The diagonal depressions of the mandrel work face include offset portions on each side of the junction of the diagonal depressions.

In one of the preferred horn embodiments disclosed, only one of the spaced triangular depressions of each pair on the horn work face overlaps the elongated depression so the horn may be utilized to seal a non-tuck-in carbon end closure. A carton having a tuck-in end closure can be sealed by another embodiment of the horn whose work face has both spaced triangular depressions of each pair overlapping the elongated depression. So as to be usable with either of the horn embodiments, the mandrel work face preferably includes a pair of the triangular projections located in an opposed relationship within the confines of one set of opposite angles defined by the diagonal depressions.

The objects, features and advantages of the present invention are readily apparent from the following detailed description of the preferred embodiments taken in connection with the accompanying drawings.

BRIEF DESCRIPTION OF THE DRAWINGS

FIG. 5 is a view of the vibrating horn taken along line 5—5 of FIG. 3;

FIG. 6 is a view of the stationary mandrel taken along line 6—6 of FIG. 4;

FIG. 7 is a view similar to FIG. 1 showing the lower portion of a conventional thermoplastic coated paperboard blank for use in forming a container of the type having a tuck-in end closure that may be sealed by apparatus of this invention;

FIG. 8 is a bottom view showing an end closure of a carton erected from the blank of FIG. 7;

FIG. 9 is a view of another vibrating horn and shows a work face thereof which is cooperable with the work face of the stationary mandrel shown in FIG. 4 to seal the carton end closure of FIG. 8; and FIG. 10 is a view taken along line 10—10 of FIG. 9 and further illustrates the vibrating horn utilized to seal the carton end closure of FIG. 8.

DETAILED DESCRIPTION OF THE PREFERRED EMBODIMENTS

Figure 1:
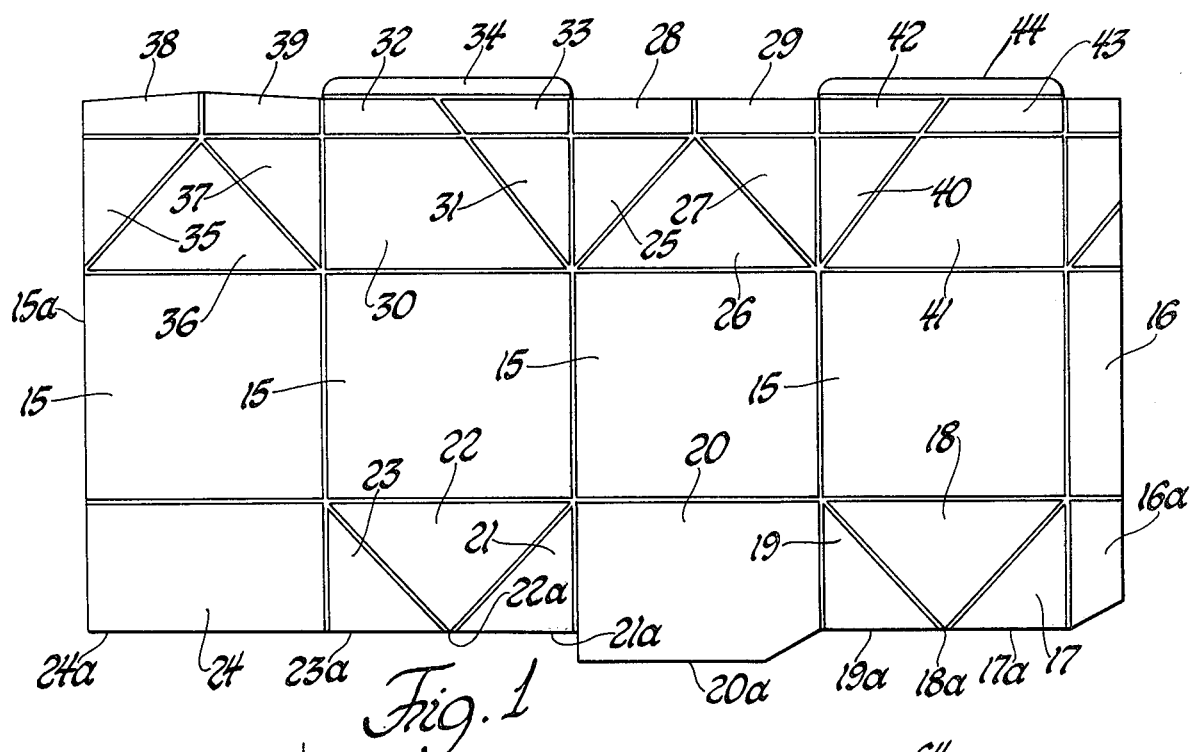
FIG. 1 is a view of a conventional thermoplastic coated paperboard blank for use in forming a container of the type having a non-tuck-in end closure that may be sealed by apparatus of this invention.

FIG. 1 represents a blank of thermoplastic coated paperboard for forming a carton having a tubular body of rectangular cross-section with end closures at opposite ends of the tubular body. The blank is divided into a plurality of panels which are adapted to form the walls and the end closures of the carton or container. The panels are formed by scored lines, and the body portion of the container is formed by four side panels 15, which panels are secured together by heat sealing or otherwise bonding a side seam flap 16 to the edge portion 15a of the panel 15 located at the opposite end of the blank from the side seam flap 16.

Figure 2:
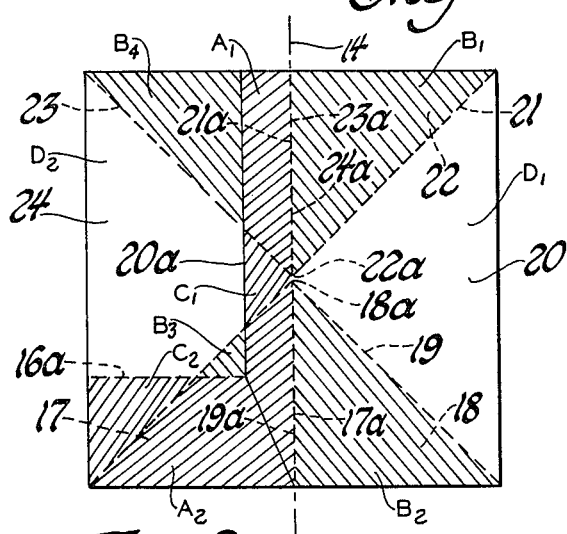
FIG. 2 is a bottom view showing a bottom end closure of a carton erected from the blank shown in FIG. 1.

The bottom end closure of the container is formed from the various rectangular and triangular panels 17, 18, 19, 20, 21, 22, 23 and 24. When the carton is folded along the score lines between the side panels 15, and the side seam flap 16 is welded to the inner surface of the end panel 15, the triangular panels 18 and 22 are folded inwardly with the panels 17 and 19 overlying the panel 18, and the panels 21 and 23 overlying the panel 22. This folding provides triangular folds of double thickness, or having the thickness of two layers of the carton material. The triangular fold formed by panels 17, 18 and 19 has an apex 18a (FIG. 2), with the edges 17a and 19a of panels 17 and 19, respectively, disposed in abutting relationship and overlying the panel 18 as illustrated in FIG. 2. Similarly, an oppositely extending triangular fold is provided by panels 21, 22 and 23 having an apex 22a, with the outer edges 21a and 23a of panels 21 and 23, respectively, disposed in abutting relationship and overlying the panel 22 as shown in FIG. 2.

When the triangular panels 18 and 22 are folded inwardly to their position illustrated in FIG. 2, edges 17a and 19a abut each other, as do edges 21a and 23a, along a center line 14 that passes through the apexes 18a and 22a. The edge 20a of panel 20 covers the edge 24a of panel 24 as shown in FIG. 2. Edge 20a overlaps the center line 14, but the edge 24a does not overlap the center line 14. The end closure shown in FIG. 2 is referred to as a non-tuck-in end closure due to the non-overlapping relationship of the edge 24a with respect to center line 14.

The lower end 16a of the side sealing strip 16 in FIG. 1 is sealed against the inner surface of the panel 24 as shown in FIG. 2.

The top end closure of the container is formed by various rectangular and triangular panels formed at the opposite ends of the side panels 15 from the bottom end closure panels 17–24. The top end closure of the container made from the blank shown in FIG. 1 is of the same construction as the top end closure of the container disclosed in U.S. Pat. No 3,905,280 issued Sept. 16, 1975. The top end closure of the container is formed with a pair of roof panel members which are inclined upwardly in the completed position and between which are disposed the inner triangular panels 26 and 36. One of the roof panel members is formed from the panels 30 and 31, and the other of the roof panel members is formed from the panels 40 and 41. A pair of triangular fold-back panels 25 and 27 are disposed on opposite sides of the inner triangular panel 26, and similarly, a pair of triangular fold-back panels 35 and 37 are disposed on opposite sides of the inner triangular panel 36. When the top end panel is completed in the manner shown in the above referred to U.S. Pat. No. 3,905,280, the inner triangular panel 26 and the adjacent fold-back panels 25 and 27 function as an extensible pouring spout. Panels 25, 26 and 27 are provided on the upper ends thereof with inner rib panels 28 and 29. The closure panels 35, 36 and 37 are provided with inner rib panels 38 and 39 on the upper ends thereof. The outer closure panels 30, 31, 40 and 41 are provided on the upper ends thereof with outer rib panels 32, 33, 42 and 43, respectively. Panels 32 and 33 are provided with an upwardly extending sealing panel 34, while the outer rib panels 42 and 43 are provided with an upwardly extending sealing panel 44. As is disclosed in detail in the above referred to U.S. Pat. No. 3,905,280, the top end closure is formed by sealing and welding the opposed surfaces of the sealing panels 34 and 44 together as well as the opposed surfaces of the panels 28, 29, 32 and 43 by heating the thermoplastic coating on the opposed surfaces to cause the coatings of the panels to flow together so that the panels will be welded together upon cooling of the thermoplastic material.

Areas of different thickness, i.e., of different numbers of layers, are indicated by shading in FIG. 2. The shaded areas A1 and A2 have four layers of material, while the shaded areas B1, B2, B3 and B4 have three layers and the shaded areas C1 and C2 have two layers. The unshaded areas D1 and D2 have thicknesses of a single layer.

Figure 3:
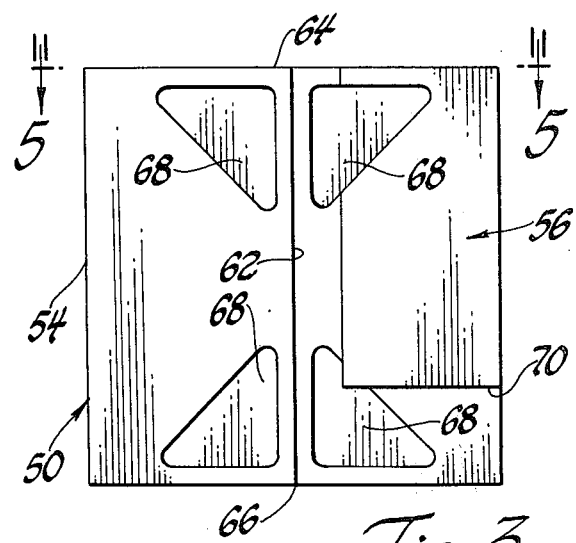
FIGS. 3 and 4 illustrate sealing apparatus of the present invention and respectively show work faces of a vibrating horn and a stationary mandrel of the apparatus.
Figure 4:
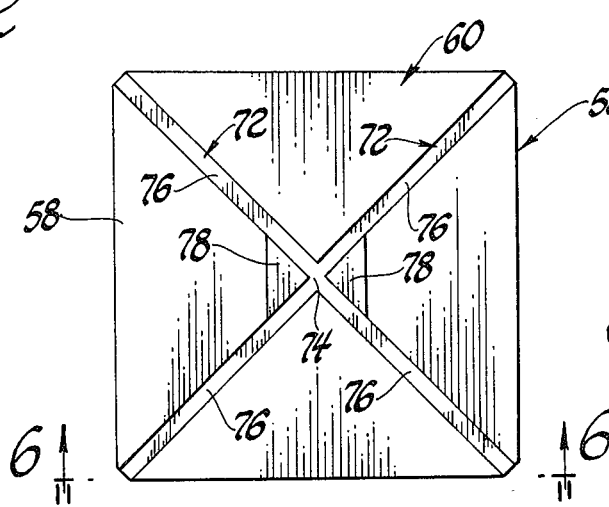

With reference to FIGS. 3 and 4, vibration sealing apparatus of the present invention includes a vibrating horn 50 shown in FIG. 3 as well as a stationary mandrel 52 shown in FIG. 4. The horn 50 includes a body 54 (FIG. 5) that defines a work face 56 having a rectangular configuration when viewed as in FIG. 3. Mandrel 52 includes a body 58 (FIG. 6) defining a work face 60 that has a rectangular configuration when viewed as in FIG. 4. During a sealing operation on an end closure as shown in FIG. 2, the horn 50 and mandrel 52 are oriented so their work faces 56 and 60 oppose each other with the end closure defined by the folded panels located between the work faces. Vibration of the horn 50 as clamping pressure is applied to the end closure between the work faces causes the sealing of the end closure to take place, as is more fully hereinafter described. Although the mandrel 52 remains stationary during this horn vibration, the mandrel and/or the horn, may be mounted for retractable movement to engage and clamp the carton end closure during the sealing operation.

As seen by combined reference to FIGS. 3 and 5, the work face 56 of horn 50 defines an elongated depression 62 that extends between opposite edges 64 and 66 thereof with a uniform, predetermined depth and width. Adjacent each opposite edge 64 and 66, the work face 56 also defines a pair of associated spaced depressions 68 that preferably have the shape of right triangles, FIG. 3. The triangular depressions 68 have a depth $t$-1 that is greater than the depth $t$-2 of the elongated depression 62. The elongated depression 62 accommodates a one layer thickness of the carton; hence the thickness $t$-2 is equal substantially to the thickness of one layer. The depressions 68 is a relief which accommodates 2 layers or more of the carton material. The thickness $t$-1 is thus approximately the same as the thickness of two layers of the carton material. The thickness $t$-1 is preferably slightly greater than the thickness of two layers of the carton as a result of the compressibility of paperboard material. As viewed in FIG. 3, each of the right-hand triangular depressions 68 partially overlaps the elongated depression 62. The lower right-hand depression 68 also overlaps an edge depression 70 that extends along the edge 66 of the work face 56 from the lower end of elongated depression 62 toward the right to the right-hand lower corner of the work face. Edge depression 70 has the same depth as the elongated depression 62 (FIG. 5).

The work face 60 of mandrel 52 defines generally diagonal depressions 72 extending between the corners thereof as seen in FIG. 4. The diagonal depressions 72 meet at a common central junction 74. On each side of the central junction 74, each diagonal depression 72 includes portions 76 that are offset from each other. Diagonal depression portions 76 define two sets of opposite angles, each angle of which is 90°. A right triangular projection 78 is located within the confines of at least one of the angles defined between the diagonal depression portions 76 and, for reasons that will follow, it is preferably for two of the projections 78 to be provided within the confines of one set of the opposite angles. The right angle vertex of each triangular projection 78 is oriented so as to point toward the angle opposite to the one whose confines receives the projection. Thus, as shown, the two right triangular projections 78 point toward each other in an opposed and spaced relationship.

As seen in FIGS. 5 and 6, the triangular projections 78 of the mandrel work face 60 have a height $t$-3 which is equal to slightly less than the thickness of two layers of the carton material because of the compressibility properties of the paperboard. The diagonal depressions 72 of the mandrel work face 60 have a depth $t$-4 equal to the thickness of two layers or more of the paperboard material of the carton.

During a sealing operation of the carton end closure shown in FIG. 2 by the horn and mandrel of FIGS. 3 and 4, the mandrel 52 is received within the erected carton so that its work face 60 engages the inside of the carton end closure. The vibrating horn 50 is then positioned so that its work face 56 engages the outer side of the carton end closure in an opposed relationship with respect to the mandrel work face 60. The mandrel is oriented so that one of its triangular projections 78 is engaged with the double layer area C1, while the horn 50 is oriented so that its edge depression 70 is aligned with the double layer area C2. The vibrating horn 50 is a component of a vibration transducer of the type disclosed in U.S. Pat. Nos. 3,432,691 and 3,526,792 such that electrical energy is converted into mechanical energy that causes vibration of the horn at a desired frequency. The formations of the work faces engage the carton end closure under a clamping pressure during the horn vibration and cause heat to be generated so as to thermally activate the thermoplastic coatings to flow or become tacky, on the panels forming the end closure. The horn vibration causes the activation of the thermoplastic material to occur in the configuration indicated by the shaded areas in FIG. 2. When the vibration of the horn is terminated, the clamping pressure may be maintained for a predetermined time period between the work surface of the horn and mandrel so the thermoplastic material can solidify and weld the layers to each other so as to seal the end closure.

The elongated depression 62 of the horn work face 56 is aligned with the four layer area A1 of the carton end closure during the sealing operation. The right angle vertices of the spaced triangular depressions 68 adjacent each horn work face edge 64 and 66 are spaced from each other and from the adjacent work face edge so that the triangular depressions form a pointed configuration that points toward the opposite edge of the work face. During the sealing operation, these triangular depressions are located on opposite sides of the carton end closure center line 14 in respective alignment with the triangular panels 17, 19, 21, and 23. The spaced relationship of the triangular depressions 68 with respect to their associated horn work face edges 64 and 66 and with respect to each other as well as the overlapping relationship of the elongated depression 62 with respect to one of the triangular depressions adjacent each work face edge provides a work face formation capable of providing an effective seal to the carton end closure shown in FIG. 2 in cooperation with the formation of the mandrel work face 60. Each of the offset diagonal depression portions 76 is aligned with the angular edge of one of the triangular panels 17, 19, 21, and 23 during the sealing so as to cooperate with the formation of the horn work face 56 in providing sealing of the triangular panel edges to the rectangular panels 20 and 24 in addition to the seal previously mentioned.

The formations of the horn and mandrel work faces 56 and 60 can readily be machined by end mill cutting operations. These cutting operations are performed on flat rectangular surfaces of the horn and mandrel bodies 54 and 58 to define the depressions and projections that are utilized to provide the carton end closure sealing described above.

As an example of the frequencies and cycle times used, when the horn 50 is designed to vibrate at a frequency of 20,000 cycles per second, for each welding operation on the thermoplastic coated paperboard of the illustrated carton, a vibration of from about 0.1 to 0.5 seconds will be required to cause the thermoplastic material to flow. Following the vibration time of from 0.1 to 0.5 seconds, the horn 50 may be held in contact with the container end closure for a period of from about 0.5 to 1.5 seconds to allow the thermoplastic material to cool and set to complete the seal along the areas where sealing occurs, as discussed above. The foregoing specific figures regarding the vibrating frequency and cycle time, as well as the setting time of the thermoplastic material are given by way of example only, and may vary, depending upon the material and thickness of the paperboard, the material and thickness of the thermoplastic coating, etc.

FIG. 7 shows the lower portion of a carton blank similar to the carton blank shown in FIG. 1 except for the shape of its panel 24 at the lower left-hand corner. The lower edge 24a of this panel extends downwardly the same distance as the panel 20 so that the lower edges 20a and 24a are aligned with each other. Consequently, the edge 24a extends past the center line 14 of the carton end closure when it is folded to the position of FIG. 8 where it is covered by the edge 20a of panel 20. The manner in which edges 20a and 24a both extend past the center line 14 is referred to as a tuck-in end closure. With certain exceptions, the folded carton end closure of FIG. 8 is the same as the carton end closure described in connection with FIG. 2. However, the double layer thickness area C1 is located on both sides of the center line 14 and has a generally bow-tie configuration. Likewise, the four layer thickness areas A1 and A2 are also located on both sides of the center line 14 and, as a result, the three layer thickness areas B1 and B2 are of smaller sizes than those shown in FIG. 2.

FIGS. 9 and 10 are views respectively similar to FIGS. 3 and 5 of another embodiment of the vibrating horn. This embodiment of the vibrating horn has primed reference numerals which otherwise are the same as those of the previously described embodiment. Likewise, much of the description of the previously described embodiment of the vibrating horn is applicable except for certain aspects that will be noted.

The vibrating horn 50' of FIGS. 9 and 10 is utilized with the mandrel 52 shown in FIG. 4 to seal the carton end closure shown in FIG. 8. To accommodate for the edge 24a that extends past the center line 14 of the carton end closure, both spaced triangular depressions 68' of the modified vibrating horn 50' overlap the shallower elongated depression 62' that extends between the opposite edges 64' and 66' of the horn work face 56'. To provide this overlapping relationship, the elongated depression 62' has a wider uniform width than the elongated depression 62 of horn 50 shown in FIG. 3. Otherwise, the two vibrating horns have the same work face formation. Additionally, the two right triangular projections 78 of the mandrel 52 are cooperable with the modified vibrating horn to seal the two layer thickness area C1 of the bow-tie configuration on the carton end closure shown in FIG. 8. To provide complete sealing of this FIG. 8 carton end closure, two sets of triangular projections 78 must be utilized; but, complete sealing of the carton end closure shown in FIG. 2 is possible with only a single projection 78 since the edge 24a of panel 24 on the FIG. 2 end closure terminates at or before the center line 14.

While detailed embodiments have herein been described, those skilled in the art will recognize various alternative embodiments and designs for practicing the present invention as defined by the following claims.

What is claimed is:

1. Vibration sealing apparatus for sealing a rectangular end closure of a thermoplastic coated paperboard carton, said apparatus comprising: a vibrating horn having a rectangular work face; a stationary mandrel having a rectangular work face for opposing the work face of the horn with the end closure of the carton therebetween; one of the rectangular work faces defining an elongated depression extending between a pair of opposite edges thereof with a predetermined depth; said one work face also defining a pair of spaced depressions associated with each of said opposite edges of the work face to which the elongated depression extends; said spaced depressions having a greater depth than the elongated depression; each pair of spaced depressions having a configuration cooperatively defined by the depressions thereof and being oriented to oppose the other pair of spaced depressions in a spaced relationship; at least one of the spaced depressions of each pair overlapping with the elongated depression from the same side thereof; the other work face having generally diagonal depressions defining a junction; and the other work face also including at least one triangular projection at the junction of the diagonal depressions.

2. Apparatus as claimed in claim 1 wherein the spaced depressions of the one work face are right triangles, the right angle vertices of each pair of spaced right triangular depressions being located adjacent each other in a spaced relationship from the associated edge of the one work face so each pair of triangular depressions forms a pointed configuration that points toward the other pair of triangular depressions, and an edge depression in the one work face extending along one of the opposite edges thereof from the elongated depression with the same depth as the elongated depression.

3. Apparatus as claimed in claim 2 wherein the diagonal depressions of the other work face include offset portions on each side of the junction of the diagonal depressions.

4. Apparatus as claimed in claim 3 wherein the one work face having the elongated and the spaced triangular depressions is on the horn and the other work face having the diagonal depressions and the triangular projection is on the mandrel.

5. Apparatus as claimed in claim 1 wherein the elongated depression of the one work face has a uniform width and wherein only one depression of each pair of spaced depressions on the one work face overlaps with the elongated depression.

6. Apparatus as claimed in claim 1 wherein the elongated depression of the one work face has a uniform width and both depressions of each pair of spaced depressions overlap with the elongated depression.

7. Vibration sealing apparatus for sealing a rectangular end closure of a thermoplastic coated paperboard carton, said apparatus comprising: a vibrating horn having a rectangular work face; a stationary mandrel having a rectangular work face for opposing the work face of the horn with the end closure of the carton therebetween; the work face of the horn defining an elongated depression extending between a pair of opposite edges thereof with a predetermined width and depth; said horn work face also defining a pair of right triangular depressions associated with each of the opposite edges of the work face to which the elongated depression extends; said right triangular depressions having a greater depth than the elongated depression; the triangular depressions of each pair being spaced from each other with the right angle vertices thereof adjacent each other and adjacent the angular depressions forms a configuration that points toward the other pair of triangular depressions in a spaced relationship thereto; at least one of the triangular depressions of each pair overlapping with the elongated depression from the same side thereof; an edge depression extending from the elongated depression along one of the opposite edges of the horn work face with the same depth as the elongated depression; the mandrel work face defining generally diagonal depressions having a central junction; and the mandrel work face including oppositely disposed right triangular projections at the junction of the diagonal depressions.

8. Apparatus as claimed in claim 7 wherein said triangular depressions on the work face have substantially the same depth as the depth of the diagonal depressions and as the height of the triangular projections on the mandrel work face.

9. A vibrating horn for sealing a rectangular end closure of a thermoplastic coated paperboard carton, said horn comprising: a body having a rectangular work face for engaging the end closure of the carton; the work face defining an elongated depression extending between a pair of opposite edges thereof with a predetermined depth; a pair of spaced depressions associated with each opposite edge of the work face and having a greater depth than the elongated depression; each pair of spaced depressions cooperatively defining a configuration that is oriented to oppose the other pair of spaced depressions in a spaced relationship; and at least one of the spaced depressions of each pair overlapping with the elongated depression from the same side thereof.

10. A horn as claimed in claim 9 wherein the work surface thereof includes an edge depression that extends from one side of the elongated depression along one of the opposite edges with the same depth as the elongated depression.

11. A horn as claimed in claim 10 wherein the spaced depressions are right triangles, the right angle vertices of the triangular depressions of each pair being located adjacent each other in a spaced relationship so each pair of triangular depressions defines a pointed configuration that points toward the other pair of depressions, and each pair of spaced triangular depressions being spaced from the associated edge of the work face.

12. A horn as claimed in claim 11 wherein only one of the triangular depressions of each pair of spaced triangular depressions overlaps the elongated depression of the work face.

13. A horn as claimed in claim 11 wherein both of the triangular depressions of each pair of spaced triangular depressions overlap the elongated depression.

14. A mandrel for sealing a rectangular end closure of a thermoplastic coated paperboard carton, said mandrel comprising: a body having a rectangular work face for engaging the end closure of the carton; diagonal depressions extending between the corners of the work face and having a junction at which two sets of opposite angles are formed; and at least one triangular projection on the work face at the junction of the diagonal depressions, said triangular projection being associatd with one of the sets of opposite angles within the confines of one of the angles thereof and being oriented so a vertex thereof points toward the other associated opposite angle in an opposed relationship.

15. A mandrel as claimed in claim 14 wherein the diagonal depressions include offset portions on opposite sides of the junction of the diagonal depressions.

16. A mandrel as claimed in claim 14 wherein the work face includes two triangular projections respectively located within the confines of the opposite angles of the one set and being oriented so that vertices thereof point toward each other in an opposed relationship.

17. A mandrel as claimed in claim 14 wherein the triangular projection is a right triangle.

* * * * *

UNITED STATES PATENT OFFICE
CERTIFICATE OF CORRECTION

Patent No. 4,011,800　　　　　　　　　Dated March 15, 1977

Inventor(s) Earl W. Walke, Jr.

It is certified that error appears in the above-identified patent and that said Letters Patent are hereby corrected as shown below:

Column 8, line 13, delete "angular" and insert therefor

--associated edge of the horn work face so that each pair of triangular--.

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*